Oct. 11, 1932.  E. R. LLEWELLYN  1,881,750

ANTIFRICTION BEARING MOUNTING

Filed March 16, 1931

Inventor
Ernest R. Llewellyn

Patented Oct. 11, 1932

1,881,750

UNITED STATES PATENT OFFICE

ERNEST R. LLEWELLYN, OF ARLINGTON, MASSACHUSETTS, ASSIGNOR TO THE HENDEY MACHINE COMPANY, OF TORRINGTON, CONNECTICUT, A CORPORATION OF CONNECTICUT

ANTIFRICTION BEARING MOUNTING

Application filed March 16, 1931. Serial No. 523,011.

This invention relates to anti-friction bearing mountings, for spindles and the like, having oppositely disposed radial or radial thrust elements as typically illustrated and advantageously adapted in a lathe tail-stock.

It is to be understood that while this invention is illustrated embodied with a lathe tail-stock, the application is not limited thereto as the elements and construction may be applied in various devices and machines to accomplish the results obtained in the illustration. There are many operations wherein anti-friction bearings are used which require extreme accuracy in the mounting and also an element of resiliency. This is best illustrated in a lathe having the usual tail-stock which is secured to the bed in the desired position.

The work is supported on oppositely disposed centers, the headstock center being rotated by and with the headstock spindle, the tail-stock center being forced with sufficient pressure into or against the work and caused to rotate by friction as the work is rotated. The pressure of the cutting tool is in the direction of the headstock, this acts to release the initial pressure on the tail-stock center and under a heavy cut will prevent the tail-stock center from revolving until sufficient heat has been generated in the work, from the cutting operation, to expand the work sufficiently to again exert the required pressure on the tail-stock center. These pressures also have a direct effect on the finished work as the work is not properly centered or supported during the cutting operation.

The object of my present invention is to provide an anti-friction bearing mounting, for spindles and the like, wherein a resilient element is provided to retain the bearings in spaced relation with a substantially uniform pre-load being exerted on the bearings under various conditions and which permits obtaining greater accuracy.

With the above and other objects in view my invention comprises a novel combination and arrangement of parts hereinafter described and more specifically pointed out in the appended claims.

In the accompanying drawing I have shown my invention sufficient to enable those skilled in the art to understand the construction and operation thereof.

Referring to the drawing:—

Figure 2:
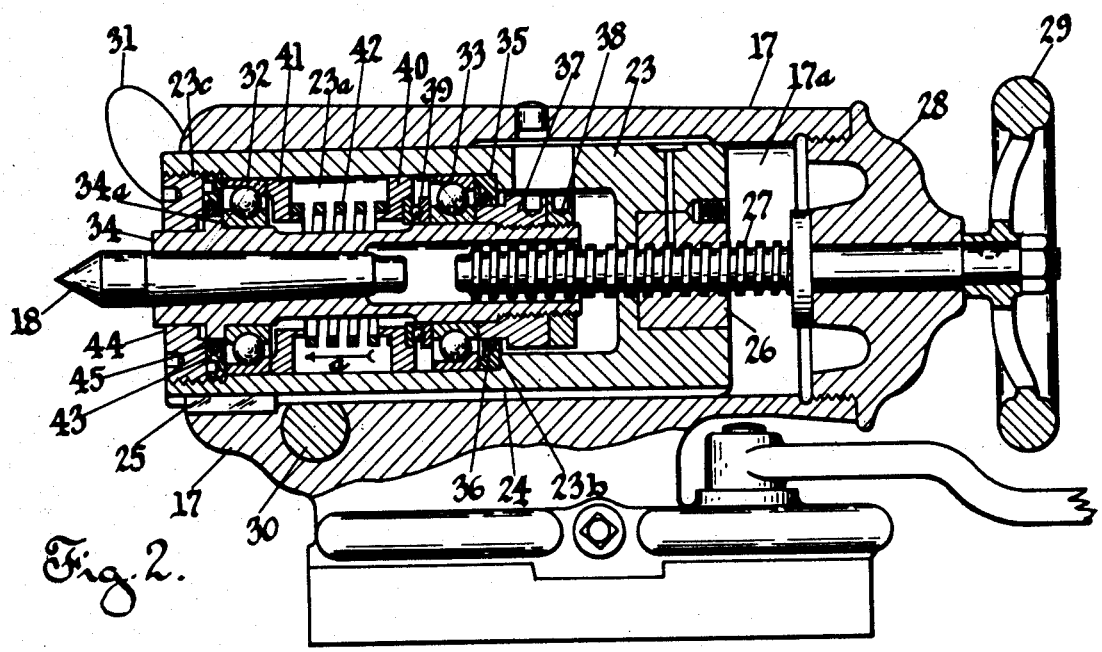
Fig. 2 is a sectional elevation of the tail-stock.
Figure 1:
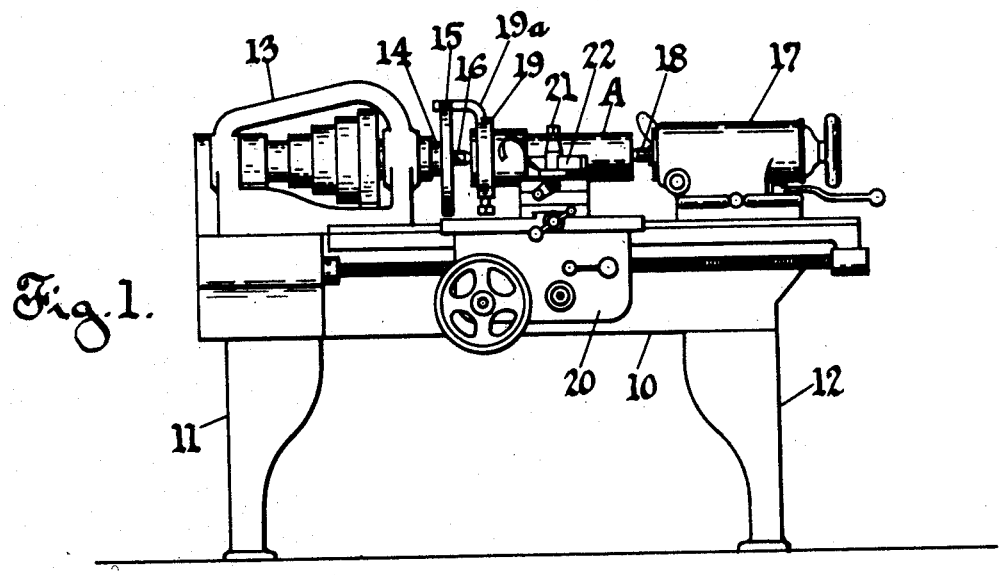
Fig. 1 is a front elevation of a lathe of conventional design having a tail-stock mounted thereon embodying my anti-friction bearing mounting.

In the drawing 10 is the lathe bed mounted on pedestals 11 and 12. The headstock 13 is secured to the bed and has rotatably mounted therein the spindle 14 which supports the face-plate 15 and work supporting center 16. The tail-stock housing 17 has mounted therein the rotatable work supporting center 18, the housing 17 being adjustably secured to the bed in any suitable manner.

The work A is supported between the centers 16 and 18 and has secured thereto a work-dog 19, the tail 19a of which engages with the face-plate 15 causing the work to be rotated with the face-plate. The lathe is provided with the usual apron and carriage 20 which support the tool-post 21 and cutting tool 22, the normal cutting operation of the tool 22 being in the direction of the headstock 13 as illustrated.

The above elements and operations are well known in the art therefore further detailed description is unnecessary.

The housing 17 has slidably mounted in the bore 17a thereof, a sleeve 23 which is provided with a key-way 24 that engages with the key 25 secured in the housing 17 thus preventing the sleeve from rotating. The sleeve 23 has secured in the inner closed end thereof a nut 26 which engages the threaded portion of the operating screw 27, rotatably mounted in the bearing portion of the end cap 28 secured to the housing 17. The outer end of said screw 27 has secured thereto a hand wheel 29 by which the screw is rotated to longitudinally move the sleeve 23 relative to the housing 17. A binder 30, of conventional form, operated by means of the lever 31, is provided to secure the sleeve 23 in the desired longitudinal position.

A chamber 23a is provided in the sleeve 23 and adapted to have mounted therein the outer races of the anti-friction bearings 32 and 33. The inner races of said bearings have mounted therein a rotatable spindle 34 adapted to receive the work center 18. A spacer 35 engages the outer race of the bearing 33 and has its bearing against a shoulder 23b formed in the chamber 23a, said spacer supporting an oil retainer 36 encircling the reduced portion of the adjusting nut 37 mounted on the threaded portion of the spindle 34, a lock nut 38 is provided to return the adjusting nut in its desired position.

Encircling the spindle 34 and engaging the inner race of the bearing 33 is a portion of the thrust member 39, the oppositely disposed portion of said thrust member, the bore of which does not engage with the spindle 34, engages the spring seat member 40, said member slidably engages and is guided by the outer wall of the chamber 23a. A spring seat member 41 engages the outer race of the bearing 32. The members 40 and 41 are provided with annular projections which axially support the compression spring 42 between said members.

The outer end of the sleeve 23 is provided with an internally threaded portion 23c adapted to receive the adjusting nut 43 and lock nut 44. The adjusting nut 43 engages the outer race of the bearing 32 and also supports the oil retainer 45 that encircles the spindle 34.

As the nut 37 that engages the inner race of the bearing 33 is tightened, the outer race of the bearing 32, through the intermediate members, is forced in the same direction against the adjusting nut 43 as indicated by arrow a, the inner race of the bearing 32 being engaged by the shoulder 34a of the spindle 34, will be drawn toward the inner race of the bearing 33. The adjusting nut 43 is actuated against the outer race of the bearing 32, this action, through the intermediate members, adjusts the inner race of the bearing 33 relative to the outer race and, through the compression spring member, exerts a substantially flexible and adjustable pre-load on the bearings. The interpositioning of the thrust member 39 retains the spring seat members 40, 41 in a substantially stationary position relative to the rotated spindle 34 thereby reducing to a minimum possible friction and wear on the rotating parts.

Having thus described my invention it will be evident to those skilled in the art that many changes and modifications may be made therein by those skilled in the art without departing from the spirit and scope thereof therefore I do not wish to be limited to the specific details herein disclosed but what I claim is:—

1. An anti-friction bearing mounting comprising an outer sleeve adapted to retain the outer races of anti-friction members, the inner races of said members supporting therein a spindle, resilient means interposed between said anti-friction members, said means engaging the inner race of one bearing and the outer race of the oppositely disposed bearing.

2. An anti-friction bearing mounting comprising an outer sleeve adapted to adjustably retain the outer races of anti-friction members, the inner races of said members supporting therein a spindle, resilient means interposed between said anti-friction members, said means indirectly engaging the inner race of one bearing and the outer race of the oppositely disposed bearing.

3. An anti-friction bearing mounting comprising an outer sleeve adapted to adjustably retain the outer races of anti-friction members, the inner races of said members supporting therein a spindle, resilient means interposed between said anti-friction members, said means engaging the inner race of one bearing and the outer race of the oppositely disposed bearing, means to longitudinally adjust said anti-friction members relative to one another.

4. An anti-friction bearing mounting comprising an outer sleeve adapted to adjustably retain the outer races of anti-friction members, the inner races of said member supporting therein a spindle, resilient means engaged by oppositely disposed retaining members interposed between said anti-friction members, said retaining members engaging the inner race of one bearing and the outer race of the oppositely disposed bearing of said anti-friction members.

5. An anti-friction bearing mounting comprising an outer sleeve adapted to adjustably retain the outer races of anti-friction members, the inner races of said members supporting therein a spindle, resilient means engaged by oppositely disposed retaining members interposed between said anti-friction members, said retaining members engaging the inner race of one bearing and the outer race of the oppositely disposed bearing of said anti-friction members, means to adjust the races of said anti-friction members relative to one another and said spindle and sleeve.

6. An anti-friction bearing mounting comprising an outer sleeve adapted to adjustably retain the outer races of anti-friction members, the inner races of said members supporting therein a spindle, resilient means engaged by oppositely disposed retaining members interposed between said anti-friction members, a supplementary thrust member interposed between one of said retaining members to co-act with the opposite retaining member to engage the inner race of one anti-friction member and the outer race of the opposed anti-friction member.

7. An anti-friction bearing mounting comprising an outer sleeve adapted to adjustably retain the outer races of anti-friction members, the inner races of said members supporting therein a spindle, resilient means engaged by oppositely disposed retaining members, said members being interposed between said anti-friction members to engage one of the races of one member and through an interposed thrust member engage the opposite race of the oppositely disposed anti-friction member, with means to longitudinally adjust said anti-friction and thrust members relative to one another and said spindle and sleeve.

In testimony whereof I have hereunto set my hand.

ERNEST R. LLEWELLYN.